(12) United States Patent
Godambe et al.

(10) Patent No.: US 7,373,125 B2
(45) Date of Patent: May 13, 2008

(54) OFF-CHANNEL SIGNAL DETECTOR WITH PROGRAMMABLE HYSTERESIS

(75) Inventors: Nihal Godambe, Plantation, FL (US);
John W. Simmons, Tamarac, FL (US);
James Goatley, Sunrise, FL (US);
Charles Ruelke, Margate, FL (US)

(73) Assignee: Motorola, Inc., Schaumburg, IL (US)

( * ) Notice: Subject to any disclaimer, the term of this patent is extended or adjusted under 35 U.S.C. 154(b) by 338 days.

(21) Appl. No.: 10/376,812

(22) Filed: Feb. 28, 2003

(65) Prior Publication Data

US 2004/0171365 A1 Sep. 2, 2004

(51) Int. Cl.
*H04B 1/06* (2006.01)
(52) U.S. Cl. .................... 455/234.1; 455/296
(58) Field of Classification Search .. 455/232.1–253.2, 455/296–312
See application file for complete search history.

(56) References Cited

U.S. PATENT DOCUMENTS

| | | | | |
|---|---|---|---|---|
| 5,940,447 A | | 8/1999 | Connell et al. | |
| 6,052,566 A | * | 4/2000 | Abramsky et al. | 455/67.11 |
| 6,122,331 A | * | 9/2000 | Dumas | 375/345 |
| 6,134,430 A | * | 10/2000 | Younis et al. | 455/340 |
| 6,229,350 B1 | | 5/2001 | Ricon-Mora | |
| 6,369,647 B1 | | 4/2002 | Main et al. | |
| 6,418,303 B1 | * | 7/2002 | Blackburn et al. | 455/234.2 |
| 6,670,901 B2 | * | 12/2003 | Brueske et al. | 341/139 |
| 6,735,422 B1 | * | 5/2004 | Baldwin et al. | 455/232.1 |

* cited by examiner

*Primary Examiner*—Edward F. Urban
*Assistant Examiner*—Adeel Haroon

(57) ABSTRACT

A communication module includes a variable gain amplifier, a mixer stage responsive to the variable gain amplifier, a post-mixer amplifier stage responsive to the mixer stage, and an off-channel signal detector responsive to the post-mixer amplifier stage. The post-mixer amplifier stage is to produce a first differential signal and a second differential signal. The off-channel signal detector has a first input to receive the first differential signal and has a second input to receive the second differential signal. The off-channel signal detector includes a programmable hysteresis comparator module, and the off-channel signal detector has an output to produce an output signal that indicates whether an off-channel signal condition is detected.

24 Claims, 3 Drawing Sheets

OFF-CHANNEL SIGNAL DETECTOR WITH PROGRAMMABLE HYSTERESIS

BACKGROUND

1. Field of the Invention

The present disclosure is generally related to a communication module including an off-channel signal detector with a programmable hysteresis comparator.

2. Description of the Related Art

Radio frequency receivers that are used in wireless devices, such as cellular telephones, typically receive a variety of signals and noise in addition to receiving and detecting the desired signal carrying communication information. The desired signal is often referred to as the channel and the other signals are referred to as off-channel signals. Strong off-channel signals produce spurious products within the channel due to non-linearity in the receiver, often impairing normal reception. With the presence of strong off-channel signals, an off-channel signal detector within the receiver may trigger a flag to indicate a strong off-channel signal condition so that adjustments may be made within the receiver to adapt to the strong off-channel condition, and preserve overall receiver linearity. One method of detecting the off-channel signal condition is to compare a detected energy level of off-channel signals against a threshold. When the detected energy level exceeds the threshold, the off-channel signal condition is indicated. A problem with this off-channel signal detection method is that due to integrated circuit process mismatches, a significant ripple in the output of the threshold detection element often causes an unstable condition (chattering) of a resulting off-channel condition detection circuit and can lead to a breakdown in operation of the receiver.

Accordingly, there is a need for an improved off-channel signal detector for use in communication receivers.

BRIEF DESCRIPTION OF THE DRAWINGS

The use of the same reference symbols in different drawings indicates similar or identical items.

DETAILED DESCRIPTION OF THE DRAWING(S)

The present disclosure is generally directed to a communication module and a method of processing communication signals. In a particular illustrative embodiment, the communication module includes a variable gain amplifier, a mixer stage responsive to the variable gain amplifier, a post-mixer amplifier stage responsive to the mixer stage, and an off-channel signal detector responsive to the post-mixer amplifier stage. The post-mixer amplifier stage is to produce an amplified first differential signal and an amplified second differential signal. The off-channel signal detector has a first input to receive the first differential signal and has a second input to receive the second differential signal. The off-channel signal detector includes an energy detector, a programmable low-pass filter and a programmable hysteresis comparator module. The off-channel signal detector produces an output signal that indicates whether a strong off-channel signal condition is detected.

In another illustrative embodiment, the communication module includes a first amplifier having a first output to produce a first differential signal, a second amplifier having a second output to produce a second differential signal, and an off-channel signal detector responsive to the first amplifier and the second amplifier. The off-channel signal detector produces an output signal to indicate whether a strong off-channel signal condition is detected.

In another illustrative embodiment, the method of processing communication signals includes receiving a radio frequency signal; performing attenuation of the radio frequency signal to produce an attenuated signal; amplifying the attenuated signal to produce an amplified signal; down-converting the amplified signal in quadrature to produce a first baseband signal and a second baseband signal; amplifying the first baseband signal to produce a first differential signal and amplifying the second baseband signal to produce a second differential signal; processing the first differential signal and the second differential signal to produce a combined signal; and performing a hysteresis comparator operation on the combined signal to produce an output signal. The output signal is to indicate whether a strong off-channel signal condition is detected.

Figure 1:
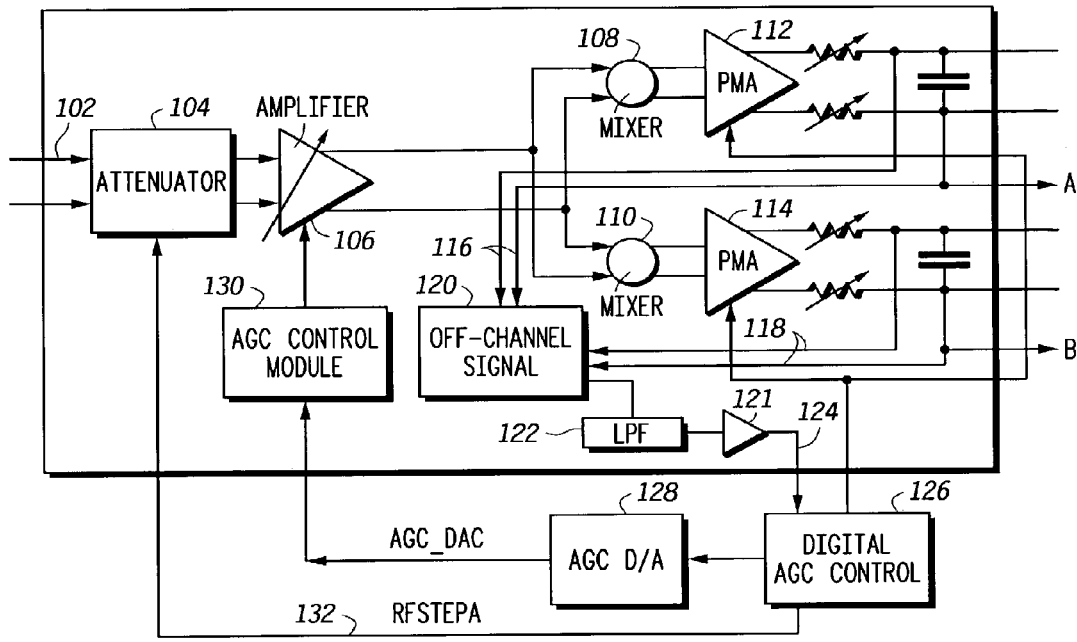
FIG. 1 is a block diagram of a communication module according to an embodiment of the invention.

Referring to FIG. 1, a communication module 100, which is within a communication receiver, is illustrated. The communication module 100 includes an attenuator 104, a variable gain amplifier 106, a mixer stage that includes a first mixer 108 and a second mixer 110, and a post-mixer amplifier stage including a first post-mixer amplifier 112 and a second post-mixer amplifier 114. The communication module 100 further includes an off-channel signal detector 120, a low pass filter 122, and a hysteresis comparator 121. The communication module 100 further includes a digital automatic gain control (AGC) module 126, an AGC digital to analog (D/A) converter 128, and an analog AGC control module 130.

The attenuator 104 receives a radio frequency signal 102 and produces an attenuated version of the radio frequency signal, which is fed as an input to the variable gain amplifier 106. The variable gain amplifier 106 produces an amplified version of the signal and provides a differential signal to the first mixer 108 and to the second mixer 110. The function of the first and second mixers 108, 110, is to quadrature down-convert the signal from RF to baseband. The first mixer 108 produces a first down-converted signal, which is fed to the first post-mixer amplifier 112, and the second mixer 110 produces a second down-converted signal, which is fed to the second post-mixer amplifier 114. The first post-mixer amplifier 112 produces an amplified differential signal 116 at baseband. Similarly, the second post-mixer amplifier 114 produces a second amplified differential signal 118 at baseband.

The off-channel signal detector 120 has a first input to receive the first differential signal 116, and a second input to receive the second differential signal 118. The off-channel signal detector 120 provides an output signal that is proportional to the energy in the off-channel signal, which is then fed to low pass filter 122. The filtered version of the output from the off-channel signal detector 120 is passed to the hysteresis comparator 121, to provide an automatic gain control (AGC) flag signal 124 that is fed to the digital AGC control module 126. The AGC flag signal 124 is indicative of whether a strong off-channel condition is detected. If the flag 124 is set, then a strong off-channel signal condition has been detected by the off-channel signal detection module 120. The digital AGC control module 126, in response to the AGC flag signal 124, produces a digital control signal, which is converted by AGC D/A unit 128 to an analog control to the AGC control unit 130. In addition, the digital AGC control module 126 may also produce a radio frequency step attenuation signal 132, which controls the attenuator 104 in a feedback fashion.

Figure 2:
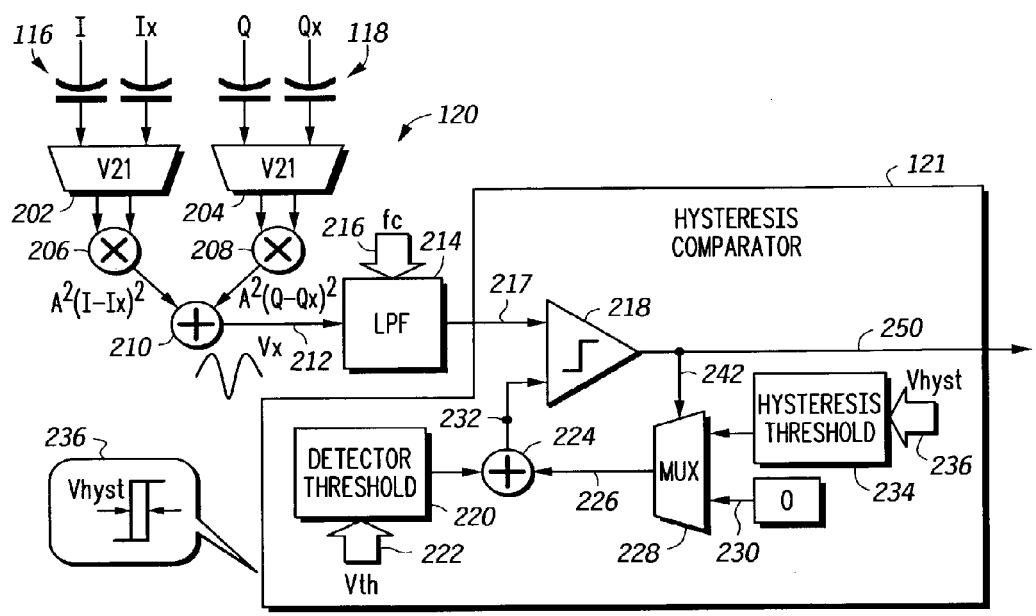
FIG. 2 is a block diagram that further describers an off-channel signal detector portion of the communication module of FIG. 1.

Referring to FIG. 2, further details of an illustrative embodiment of the off-channel signal detection module 120 and hysteresis comparator 121 are shown. The off-channel signal detection module 120 includes a first voltage to current converter 202, a second voltage to current converter 204, a first multiplier 206, a second multiplier 208, and a summer unit 210. The off-channel signal detection module 120 further includes a low pass filter 214 and a programmable hysteresis comparator module 121. The low pass filter 214 receives filter control parameters 216 and is responsive to an output of the summer unit 210. The hysteresis comparator 121 is responsive to the low pass filter 214.

The hysteresis comparator 121 in a particular embodiment is programmable and includes a comparator element 218, a summer 224, and a multiplexer (MUX) 228. The summer 224 is responsive to voltage detector threshold unit 220 that receives a programmable voltage threshold 222. The MUX 228 has a first input to receive a hysteresis voltage indicator from a hysteresis voltage threshold unit 234, and a second input to receive a constant value 230, which may be a logic zero level as indicated. The hysteresis voltage threshold unit 234 receives a programmable hysteresis voltage level 236. The hysteresis voltage 236 is also illustrated as a width of a hysteresis curve for the desired hysteresis response function of the comparison module. The MUX 228 also includes a selection input 242 to receive an output 250 from the comparator element 218.

During operation, the first received differential signal 116, which includes quadrature I (in-phase) components, is received at the first voltage to current converter 202. Similarly, the second differential signal 118 (including quadrature Q components) is received at the second voltage to current converter 204. The outputs of the voltage to current converters are respectively fed to multiplier units 206, 208, which act as squarers. The resulting multiplication outputs are fed to summer 210 to produce a combined sum-of-squares signal 212 (labeled $V_x$). The sum-of-squares output signal 212 is fed to the low pass filter 214 to produce a filtered version 217 of the sum-of-squares signal to be fed to the programmable hysteresis comparator module 121. The low pass filter 214, filters residual ripple on output 212 to fall within the hysteresis settings 236. The programmable filter settings 216 set the filter corner and the overall AGC loop attack time. The sum-of-squares signal 212 is indicative of the energy of the received signal and is used to indicate the presence of strong off-channel signals.

The filtered sum-of-squares signal 217 is received at the comparator element 218 at a first input. A second input of comparator 218 is provided by hysteresis control circuitry including the summer 224 and the MUX 228. The summer 224 receives the programmable voltage threshold level 222 and alternately receives either the programmable hysteresis voltage 236 or a constant voltage 230 as selected by MUX 228. The summer 224 then produces the comparator threshold with hysteresis 232, which is fed to the second input of comparator element 218. The comparator 218 performs a hysteresis comparator operation on the first and second comparator inputs to produce an output signal 250. The output signal 250 is indicative of the presence of off-channel signals exceeding the selected voltage threshold. In addition, by applying the programmable hysteresis voltage 236, the output signal 250 has hysteresis properties and addresses the potentially damaging ripple effect often caused by integrated circuit process mismatch. In the particular embodiment illustrated in FIG. 2, the voltage to current converters 202 and 204 have wide-band capability (about five to ten Megahertz, for wide-band modulation schemes) and have low offsets. In addition, the circuit elements, including the multipliers 206 and 208 and the summer 210, are well matched to further decrease offsets. Any offsets in the detector signal path manifest themselves as ripple at the detector output level 212 that, if un-addressed like in certain prior art implementations, may cause chattering (unstable oscillation) of the detector output 250.

The disclosed embodiment of the off-channel signal detector 120 has many benefits. For example, using the disclosed programmable off-channel signal detector significantly reduces and may even avoid trimming or tuning at the radio level while addressing variable ripple due to process mismatch. In addition, the inputs to the programmable off-channel signal detector are AC coupled to substantially reduce offsets from propagating through the circuit. Further, the use of wide-band voltage to current converters provides for detection of off-channel signals in wide-band modulation schemes. Finally, the undesirable ripple effect seen in certain prior art implementations is significantly reduced through the use of programmable low pass filters, programmable hysteresis loops, and the programming and setting of accurate voltage thresholds within the loop. Thus, the off-channel signal detector is a useful element as part of an automatic gain control loop within a radio frequency receiver.

Figure 3:
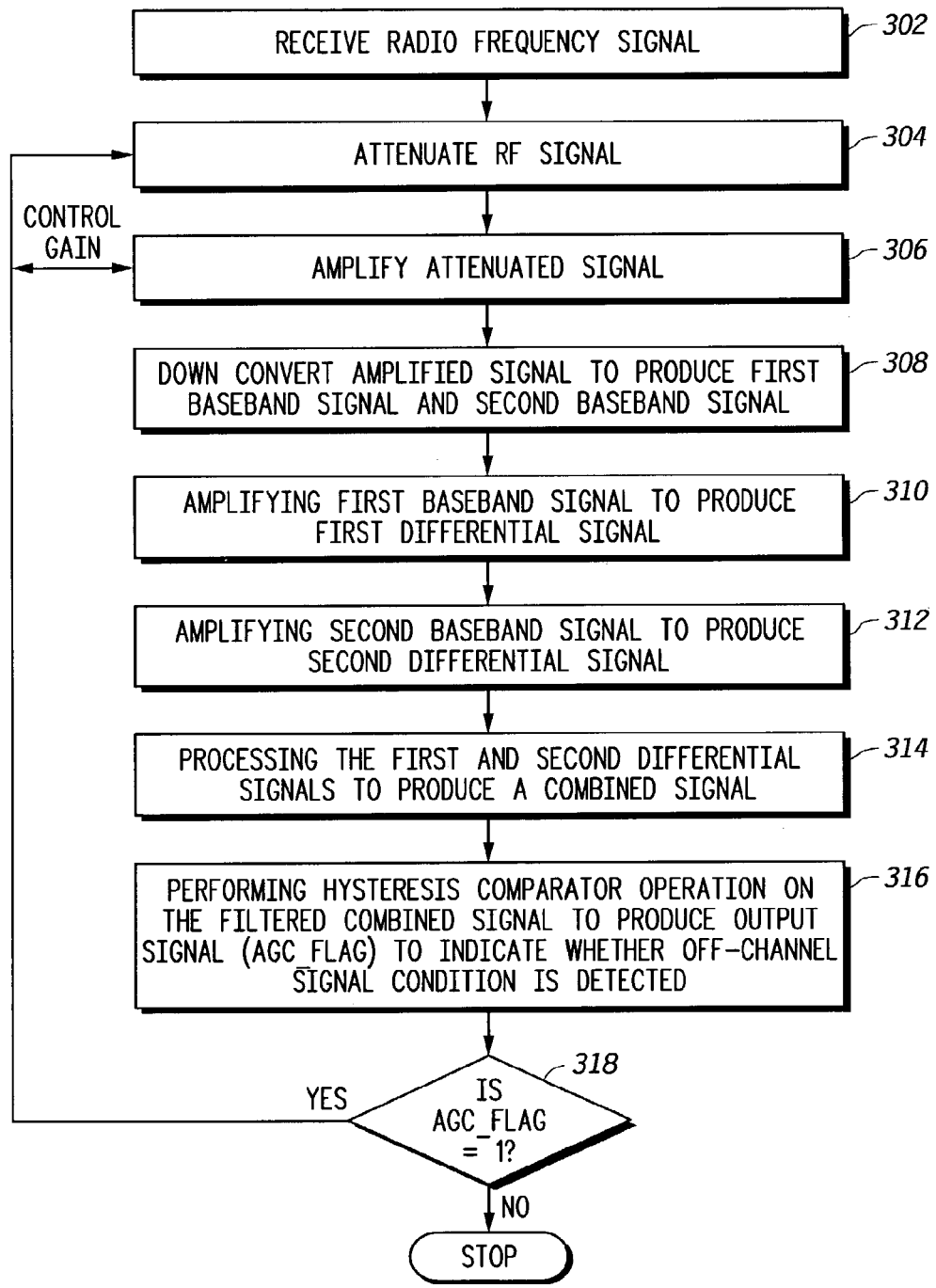
FIG. 3 is a flow chart that illustrates operation of the communication module.

Referring to FIG. 3, a flowchart is disclosed to illustrate various steps during the operation of the communication module 100. A radio frequency signal is received, as shown at step 302, and the received radio frequency signal is attenuated, as shown at step 304. The attenuated signal is then amplified, as shown at step 306, and down-converted to produce a first baseband signal and a second baseband signal, as shown at step 308. The first baseband signal is amplified to produce a first differential signal, as shown at step 310. Similarly, the second baseband signal is amplified to produce a second differential signal, as shown at step 312. The first and second differential signals are then processed by appropriate circuitry to produce a combined signal, as shown at step 314. An example of a combined signal is the sum-of-squares signal 212 referred to with respect to FIG. 2. A hysteresis comparator operation is then performed on the filtered combined signal to produce an output signal, AGC_FLAG 124 that is indicative of whether a strong off-channel condition is detected, as shown at step 316. The AGC_FLAG one bit level is conveyed to the digital AGC control 126, which produces two control signals to control the attenuator 102 and the amplifier 104. As shown at step 318, if the AGC_FLAG is set high then the attenuation in the RF attenuator 304 is increased; or/and the gain in the variable gain amplifier at 306 is decreased. This AGC loop from 304 to 318 is enabled until the AGC_FLAG is detected to be low.

Figure 4:
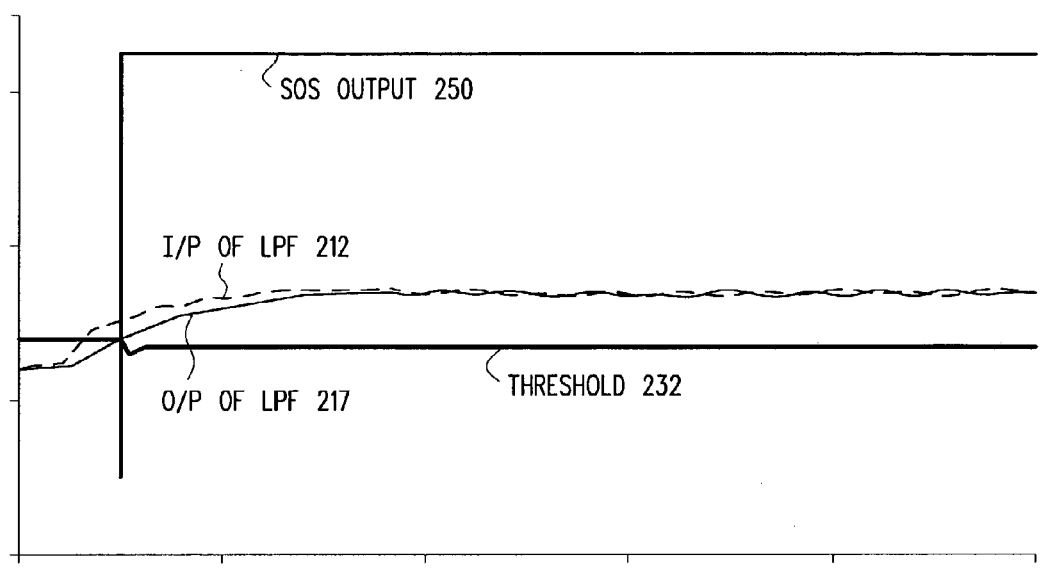
FIG. 4 is a general diagram that illustrates a sample display of certain signals associated with the communication module of FIG. 1 and the off-channel signal detector of FIG. 2.

Referring to FIG. 4, a graphical display of various signals corresponding to the disclosed communication module is illustrated. The graphical display of FIG. 4 illustrates the output signal 250, the input signal 212 to the low pass filter 214, the output of the low pass filter 217, and the comparator threshold 232. As shown, on receiving a strong off-channel signal the output level of the low pass filter 217 gradually increases and finally settles in at a substantially constant level, indicative of the off-channel signal strength. The input signal 212 has a small residual ripple on it, which has been almost eliminated by the filter as seen on the filtered output 217. The output 250 of the hysteresis comparator transitions from the low state to the high state on comparison. The disclosed transition of the voltage threshold 232, after the signal transition of the output signal 250 illustrates the hysteresis comparison operation effect on the output signals. In addition, with the operation and application of the hysteresis comparator and the low-pass filter, the deleterious effect of the ripple due to integrated circuit process mismatch has been nullified. Thus, an improved communication module with an off-channel signal detector that addresses the integrated circuit process mismatch ripple problem has been disclosed.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A communication module comprising:
   a variable gain amplifier;
   a mixer stage responsive to the variable gain amplifier;
   a post-mixer amplifier stage responsive to the mixer stage, the post-mixer amplifier stage to produce an amplified first differential signal and an amplified second differential signal;
   an off-channel signal detector responsive to the post-mixer amplifier stage, the off-channel signal detector having a first input to receive the amplified first differential signal and having a second input to receive the amplified second differential signal, the off-channel signal detector including a programmable hysteresis comparator module, the off-channel signal detector to produce an output signal to indicate whether an off-channel signal condition is detected, wherein the programmable hysteresis comparator module has a programmable hysteresis threshold; and
   wherein the programmable hysteresis comparator module includes a comparator element and a summer element having a first input and a second input, the first input responsive to a voltage threshold detector, the second input responsive to a multiplexer.

2. The communication module of claim 1 wherein the output signal is a flag that is input to an automatic gain control module.

3. The communication module of claim 1, wherein the mixer stage includes a first mixer element and a second mixer element, for quadrature detection.

4. The communication module of claim 3, wherein the post-mixer amplifier stage includes a first post-mixer amplifier element responsive to the first mixer element and a second post-mixer amplifier element responsive to the second mixer element and wherein the first post-mixer amplifier produces the amplified first differential signal and the second post-mixer amplifier produces the amplified second differential signal.

5. The communication module of claim 1, wherein the off-channel signal detector further comprises a first voltage to current converter responsive to the first input and a second voltage to current converter responsive to the second input.

6. The communication module of claim 5, wherein the off-channel signal detector further comprises a first multiplier responsive to the first voltage to current converter and a second multiplier responsive to the second voltage to current converter.

7. The communication module of claim 6, wherein the off-channel signal detector further comprises a summer responsive to the first multiplier and the second multiplier and a low pass filter responsive to the summer.

8. The communication module of claim 7 wherein the programmable hysteresis comparator module is responsive to the low pass filter.

9. The communication module of claim 1, wherein the multiplexer has a first multiplexer input to receive a hysteresis threshold voltage.

10. The communication module of claim 9, wherein the multiplexer has a second multiplexer input to receive a constant voltage.

11. The communication module of claim 9, wherein the multiplexer has a selection input, the selection input responsive to an output of the comparator element.

12. The communication module of claim 1, wherein the comparator output is the output signal to indicate whether an off-channel signal condition is detected.

13. The communication module of claim 1, wherein the first differential signal and the second differential signal are each quadrature signals.

14. A communication module comprising:
    a first amplifier having a first output to produce a first differential signal;
    a second amplifier having a second output to produce a second differential signal; and
    an off-channel signal detector responsive to the first amplifier and the second amplifier, the off-channel signal detector having a first input to receive the first differential signal and having a second input to receive the second differential signal, the off channel signal detector including a programmable hysteresis comparator module, the off-channel signal detector producing an off-channel signal output signal to indicate whether an off channel signal condition is detected;
    wherein the programmable hysteresis comparator module has a programmable hysteresis threshold and includes a comparator element, a summer element having a first input and a second input, the first input responsive to a voltage threshold detector and the second input responsive to a multiplexer, wherein the multiplexer has a first multiplexer input to receive a hysteresis threshold voltage and wherein the multiplexer has a second multiplexer input to receive a constant voltage.

15. The communication module of claim 14, wherein the output signal is an automatic gain control flag that is input to an automatic gain control module.

16. The communication module of claim 14, wherein the off-channel signal detector further comprises a first voltage to current converter responsive to the first input and a second voltage to current converter responsive to the second input.

17. The communication module of claim 16, wherein the off-channel signal detector further comprises a first multiplier responsive to the first voltage to current converter and a second multiplier responsive to the second voltage to current converter.

18. The communication module of claim 17, wherein the off-channel signal detector further comprises a summer responsive to the first multiplier and the second multiplier and a low pass filter responsive to the summer.

19. The communication module of claim 18, wherein the programmable hysteresis comparator module is responsive to the low pass filter.

20. The communication module of claim 16, wherein the voltage to current converters utilize a wideband topology to detect off-channel signals, the off-channel signals having a frequency difference of up to 5 Megahertz.

21. The communication module of claim 14, wherein the multiplexer has a selection input, the selection input responsive to a comparator output of the comparator element.

22. The communication module of claim 14, wherein the programmable hysteresis comparator module includes a comparator element responsive to a programmable hysteresis threshold.

23. The communication module of claim 22, wherein the comparator element is further responsive to a programmable voltage threshold.

24. The communication module of claim 14, wherein the first input and the second input are each AC coupled.

* * * * *